(12) United States Patent
Chang (10) Patent No.: US 12,248,920 B2
(45) Date of Patent: Mar. 11, 2025

(54) INTELLIGENT SHELF MANAGEMENT SYSTEM AND OPERATING METHOD

(71) Applicant: PERFECT INTELLIGENT TECHNOLOGY LIMITED TAIWAN BRANCH (H.K.), Tainan (TW)

(72) Inventor: Huan-Chia Chang, Tainan (TW)

(73) Assignee: Perfect Intelligent Technology Limited Taiwan Branch (H.K.), Tainan (TW)

( * ) Notice: Subject to any disclaimer, the term of this patent is extended or adjusted under 35 U.S.C. 154(b) by 270 days.

(21) Appl. No.: 17/663,115

(22) Filed: May 12, 2022

(65) Prior Publication Data

US 2022/0366392 A1 Nov. 17, 2022

(30) Foreign Application Priority Data

May 13, 2021 (TW) .................................. 110117333

(51) Int. Cl.
*G06Q 30/00* (2023.01)
*G06Q 20/20* (2012.01)

(52) U.S. Cl.
CPC ......... *G06Q 20/201* (2013.01); *G06Q 20/208* (2013.01)

(58) Field of Classification Search
CPC ........... G06Q 30/06–08; G06Q 20/201; G06Q 20/208
See application file for complete search history.

(56) References Cited

U.S. PATENT DOCUMENTS 11,042,834 B2 * 6/2021 Pike ........................ G10L 15/30
2003/0163399 A1 * 8/2003 Harper ................... G06Q 10/10
705/35

(Continued)

FOREIGN PATENT DOCUMENTS

TW 202029078 A 8/2020

OTHER PUBLICATIONS

Yang, Su et al., "Lightweight Deep Learning Model for Marketing Strategy Optimization and Characteristic Analysis", Computational Intelligence and Neuroscience: CIN 2022, Hindawi Limited (Year: 2022).*

*Primary Examiner* — Ethan D Civan
(74) *Attorney, Agent, or Firm* — Rosenberg, Klein & Lee (57) ABSTRACT

An intelligent shelf management system and operating method are revealed. The system includes an operating and display device by which users input their demands of goods; an information module electrically connected to the operating and display device and comprising a database of goods and an analysis module which receives and analyzes the demands of goods input and finds out product information matched after comparison with information in the database; a content management system electrically connected to the information module and receiving the product information from the analysis module; and a point-of-sale system having a plurality pieces of related sales information and electrically connected to the content management system or the information module. The content management system compares the product information with the plurality pieces of related sales information to collect and send the related sales information matched to the operating and display device.

4 Claims, 4 Drawing Sheets

(56) References Cited

U.S. PATENT DOCUMENTS

| | | | |
|---|---|---|---|
| 2019/0034896 A1* | 1/2019 | Gaur | G07F 9/026 |
| 2020/0074402 A1* | 3/2020 | Adato | G06V 20/52 |
| 2021/0174164 A1* | 6/2021 | Hsieh | G06Q 30/0282 |

* cited by examiner

INTELLIGENT SHELF MANAGEMENT SYSTEM AND OPERATING METHOD

BACKGROUND OF THE INVENTION

Field of the Invention

The present invention relates to an intelligent shelf management system and operating method, especially to an intelligent shelf management system and operating method which provides sales information to consumers quickly and actively

Description of Related Art

Current stores in retail industry can be categorized into several categories such as grocery stores or hypermarket providing various types of products. Each of them has different brands and functions for consumers to choose. Thus, it takes a lot of time and effort for consumers to find out products they need. Although there are service staffs who help consumers to find products they need in majority of stores, the number of service staffs is limited. Once positioning of the products are changed, the service staff might not notice the change in a real time and cannot provide the correct product information to consumers immediately. Moreover, prices of the products are often changed due to different promotions in the store and price tags of the products are unable to have real-time corrections. Thereby consumers may have unpleasant experiences due to difference between the price tags and the payment amount. In conclusion, there is a need to address the above issue and provide positive experiences to consumers.

Refer to Taiwanese Pat. Pub, No. 202029078(A), a smart shopping mall system and a controlling method thereof are revealed. An image information of a customer came into a shopping mall is captured by a camera. Then an external feature of the customer is analyzed according to the image information to generate a clerk recommendation information or a product recommendation information. The clerk recommendation information is used to assign a clerk to serve the customer while the product recommendation information is used to recommend a product to the customer. However, this system is mainly used to recommend suitable products to the customers. For customers who have already decided what products they are going to buy, the system is still unable to provide particular product information to consumers who intend to collect quickly.

Thus, there is room for improvement and a need to provide a novel system which addresses the issues mentioned above.

SUMMARY OF THE INVENTION

Therefore, the primary object of the present invention is to provide an intelligent shelf management system which compares demands of goods input by consumers with information inside a database of goods by means of an information module, a content management system, and a point-of-sale system to screen and find out product information matched and provide relevant sales information such as position information of the goods on shelves to the consumers. Thereby the consumers can find goods they need conveniently and quickly.

In order to achieve the above object, an intelligent shelf management system based on the present invention includes an operating and display device, an information module, a content management system, and a point-of-sale system. The operating and display device allows consumers to input their demands for goods. The information module which is electrically connected to the operating and display device comprises an analysis module and a database of goods provided with a plurality pieces of product information. The analysis module collects and analyzes the demands of goods input from consumers and then compares the demands for goods with the product information in the database of goods to find out the product information matched the demands for goods. The content management system is electrically connected to the information module to receive the product information matched the demands for goods from the analysis module. The point-of-sale system which includes a plurality pieces of related sales information is electrically connected to the content management system or the information module, while the related sales information includes position information and stock information of goods, selling price and promotion mix. The content management system compares the product information matched with the demands for goods with the plurality pieces of related sales information to get the related sales information matched the product information and deliver the related sales information matched to the operating and display device for consumers' reference.

A method of operating an intelligent shelf management system based on the present invention includes a plurality of steps. Step 1: input a demand of goods on an operating and display device and deliver the demand of goods to an information module which is electrically connected to the operating and display device and comprises an analysis module and a database of goods. Step 2: collect and analyze the demand of goods and compare the demand of goods with a plurality pieces of product information in the database of goods by the analysis module to find out at least one piece of the product information which matches the demand of goods. Step 3: deliver the at least one piece of the product information to a content management system which is not only electrically connected to the information module but also connected to a point-of-sale system by a wireless network or a common network; the point-of-sale system includes a plurality pieces of related sales information. Step 4: compare the at least one piece of the product information with the related sales information of the point-of-sale system to get the related sales information which matches the at least one piece of the product information and then deliver the related sales information to the operating and display device.

Preferably, the information module is a relational analysis rule of the demand of goods which is established by deep learning approach.

Preferably, the operating and display device includes a touch interface, a voice operated device, and a display interface.

Preferably, the present system further includes a camera recognition module which is electrically connected to the point-of-sale system and the information module, and the camera recognition module comprises at least one image capture device and an image recognition module. The at least one image capture device is labeled with a number and used to shoot at least one piece of the goods on a shelf to collect image information and send the image information to the image recognition module for recognition of appearance and position of the goods. Thus, a recognition result is obtained and delivered to the point-of-sale system together with the number of the image capture device which captures the image information to be integrated in the point-of-sale system for generating position information of the goods.

Preferably, the image recognition module sets up a recognition rule based on deep learning approach.

Preferably, the camera recognition module includes a plurality of image capture devices.

Preferably, a product tag is displayed on a shelf and located around the respective goods.

Preferably, related information of the goods includes price information of the goods and other sales platforms allow consumers to purchase the goods.

Thereby the present system provides the suitable goods and the positions of the goods quickly to consumers after the input of demand of goods from the consumer was given on the system. The consumer can select and buy the goods they need after that. Not only the time and effort the consumer spends on finding the goods are reduced, the number of service staff required in stores is also decreased. Therefore, the operating cost could be lower.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
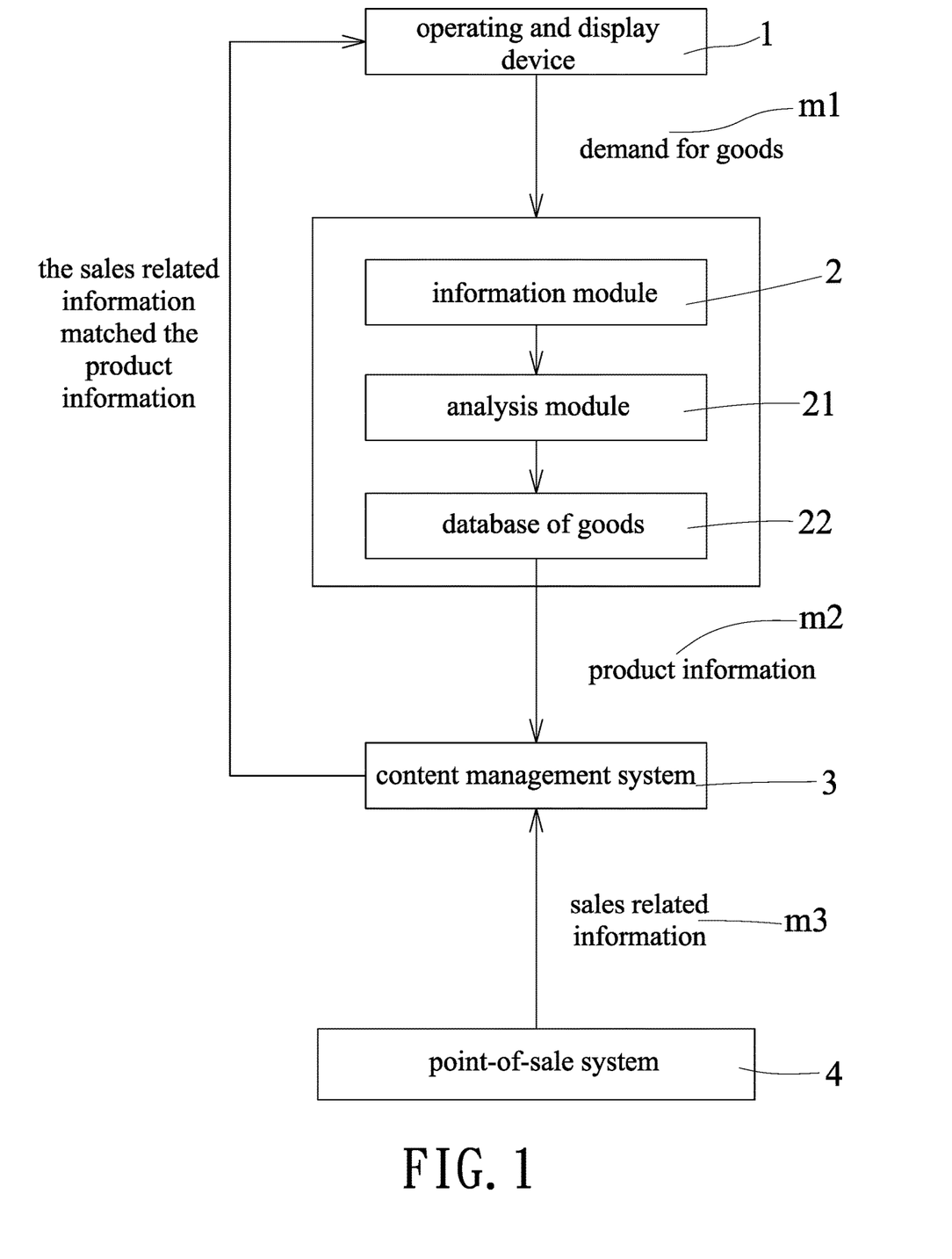
FIG. 1 is a schematic drawing showing structure of the present invention.
Figure 3:
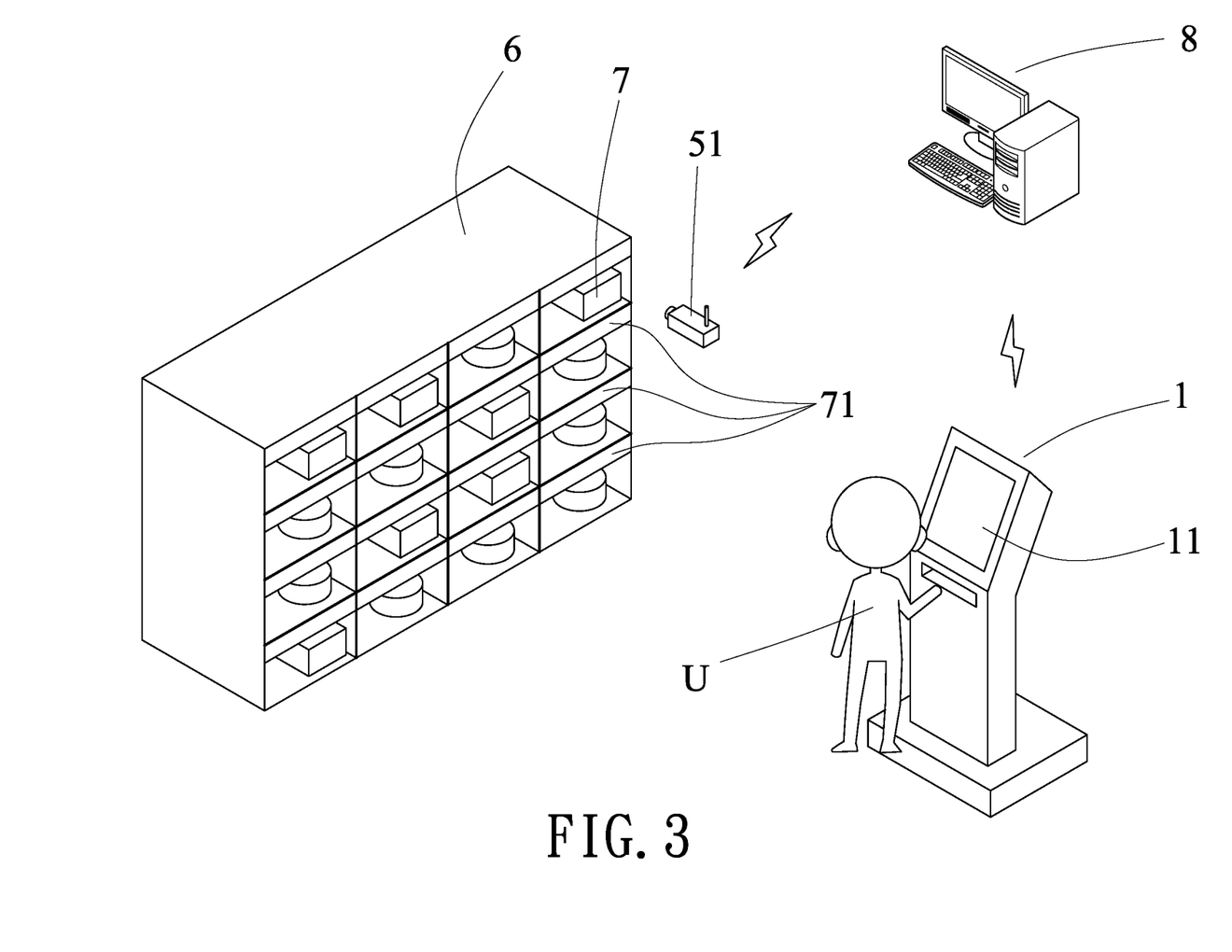
FIG. 3 is a schematic drawing showing an embodiment in use according to the present invention.

Refer to FIG. 1 and FIG. 3, an intelligent shelf management system based on the present invention mainly includes an operating and display device 1, an information module 2, a content management system 3, and a point-of-sale system 4. The operating and display device 1 consists of a touch interface, a voice operated device, and a display interface. The operating and display device 1 which can also be a touch screen 11 or a display screen with a microphone is electrically connected to the information module 2 which comprises an analysis module 21 and a database of goods 22 for establishing relational analysis rules of goods demand based on deep learning approach. The content management system 3 is electrically connected to the information module 2 and the point-of-sale system 4 which includes a plurality pieces of related sales information such as position information of goods on shelves, price information of goods, amounts of goods in stock (stock information of goods), etc. As to the above relational analysis rules, dividing goods in the database of goods 22 into groups based on their characteristics at first. Taking a pharmacy store's system as an example. A demand-analysis model of ingredients or functions of all medicines or health food is trained by deep learning approach. The suitable ingredients of medicines or health food are quickly calculated and provided to consumers for reference after demands are input. Moreover, the deep learning approach integrates technologies of neural networks, decision trees, and random forests to develop the relational analysis rules of goods demand mentioned above.

Figure 2:
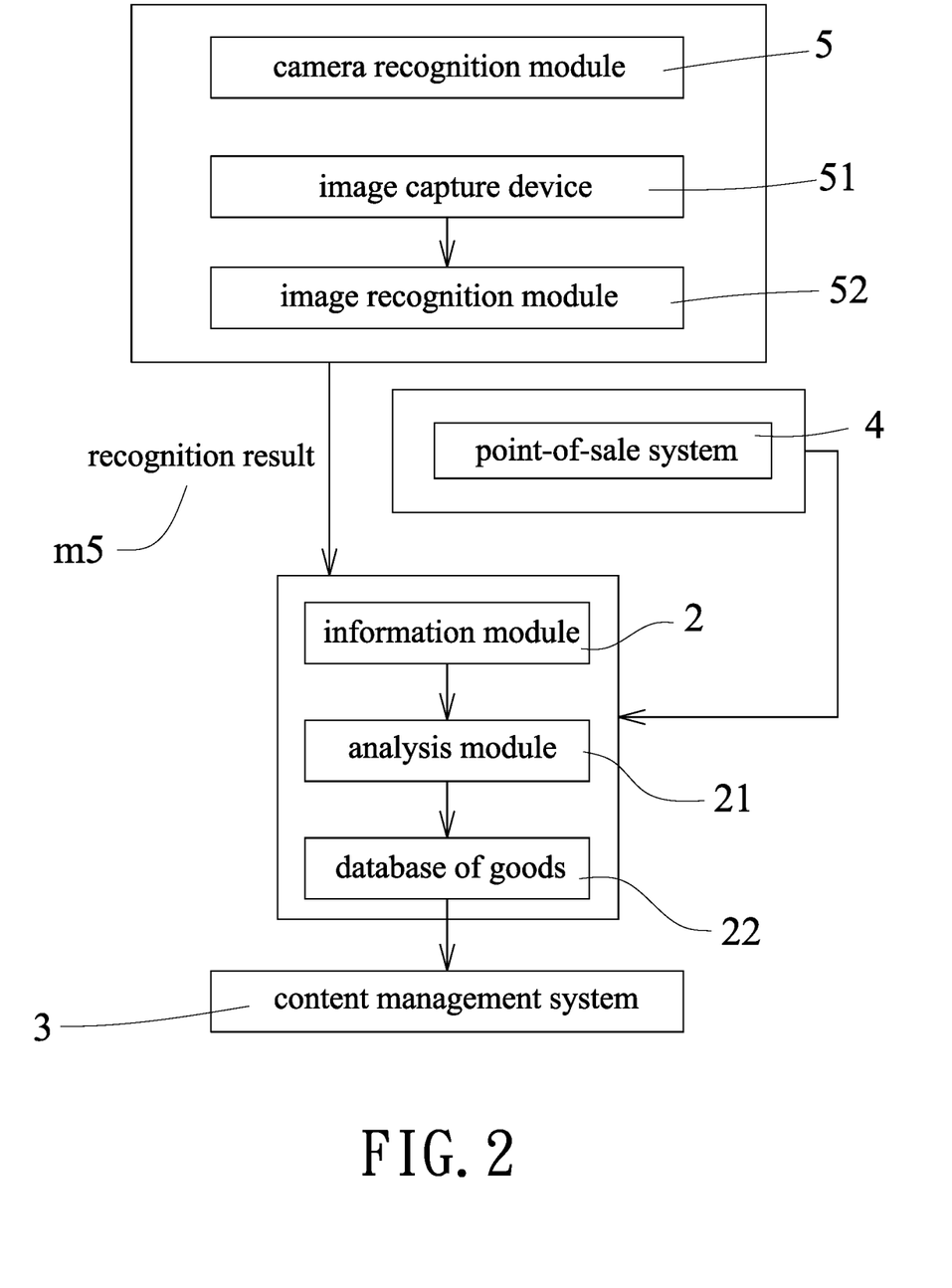
FIG. 2 is a schematic drawing showing structure of a camera recognition module of an embodiment according to the present invention.

Refer to FIG. 2 and FIG. 3, the present system further includes a camera recognition module 5 which is electrically connected to the point-of-sale system 4 and the information module 2 and comprises at least one image capture device 51 and an image recognition module 52. The image capture device 51 can be different types of cameras such as a wireless network internet protocol camera (IP cam) for surveillance.

A product tag 71 which can be a touch display device is placed on a shelf 6 and located around respective goods 7 for showing information related to the goods 7 such as prices, promotions, other available platforms for users to buy the goods 7, etc.

Refer to FIG. 1-4, pharmacies and drugstores are taken as an example in this embodiment. After entering into the store, a consumer U inputs his/her demand of goods (goods they are looking for) m1 by the operating and display device 1 such as the touch screen 11 or the voice operated device at first. For instance, the touch screen 11 in a pharmacy shows a schematic drawing of human organs or body parts. Once the consumer U is looking for medicines for nose allergy or stuffy nose, he/she clicks on a nose icon or says "nose" or "nasal". Then the touch screen 11 displays symptoms of diseases associated with the nose and the demand for goods m1 is sent to the information module 2 after the consumer U selects the corresponding symptoms. The analysis module 21 of the information module 2 analyzes the demand of goods m1 received to get suitable product information m2 from the database of goods 22 after comparison and send the product information m2 to the content management system 3. In this embodiment, the product information m2 includes ingredients of medicines which correspond to nasal symptoms.

The analysis module 21 of the information module 2 also carries out relational analysis to get relational analysis rules between the demand of goods m1 and the product information m2. Taking the above pharmacy as an example. The ingredients of medicines associated with the symptoms are obtained after analysis of the symptoms input by the consumer U and then compared with information in the database of goods 22 to check whether the pharmacy has the medicines containing the related ingredients.

Refer to FIG. 2, the image capture device 51 of the camera recognition module 5 shoots the goods 7 on the shelf 6 to get image information and send the image information to the image recognition module 52 for recognition of appearance and positions of the goods 7 and learning positions of specific goods. This is a recognition result m5. The respective image capture devices 51 are labeled with different numbers or having different IP addresses. Both the recognition result m5 and the number of the image capture device 51 which sends image information are delivered to the database of goods 22 of the information module 2 then delivered to the content management system 3.

In a preferred embodiment, the image recognition module 52 sets up recognition rules based on deep learning. In order to establish the recognition rules, using images of the appearance of the goods 7 taken at different angles to set up a database is the first step. Step 2 is training an image recognition model by using deep learning approach. Thereby types and names of the goods 7 can be inferred by input of the images captured by the image capture device 51 into the image recognition model. The deep learning approach combines technologies of neural networks, pattern recognition, and digital image processing.

The present system uses the camera recognition module 5 to recognize the positions of the goods 7 on the shelf 6 automatically. Thus, even the positions of the goods 7 are changed, the camera recognition module 5 can still be used to recognize the positions of the goods 7 and deliver the recognition result m5 to the content management system 3, without input of the latest positions of the goods 7 again by labors. The possibility of input error caused by manual input is also lowered. At the same time, the content management system 3 also receives product information m2 from the database of goods 22 of the information module 2, or the content management system 3 also receives related sales information m3 from the point-of-sale system 4 while the sales related information m3 includes position information of goods m4.

The content management system 3 compares the product information m2 received with the plurality of the related sales information m3 received for finding out the related sales information m3 that matches the product information m2. Then the matched related sales information m3 is sent to the operating and display device 1 by the content management system 3 and provided to the consumer U so that the consumer U can move to the corresponding shelf 6 and take the goods 7 according to the related sales information m3 displayed.

The point-of-sale system 4 includes the stock information of goods so that the content management system 3 can also get current quantity of the goods 7 in stock while obtaining the matched goods 7 from the point-of-sale system 4. Once the quantity of the goods 7 in stock is insufficient, the content management system 3 reminds staff to replenish the stock.

Figure 4:
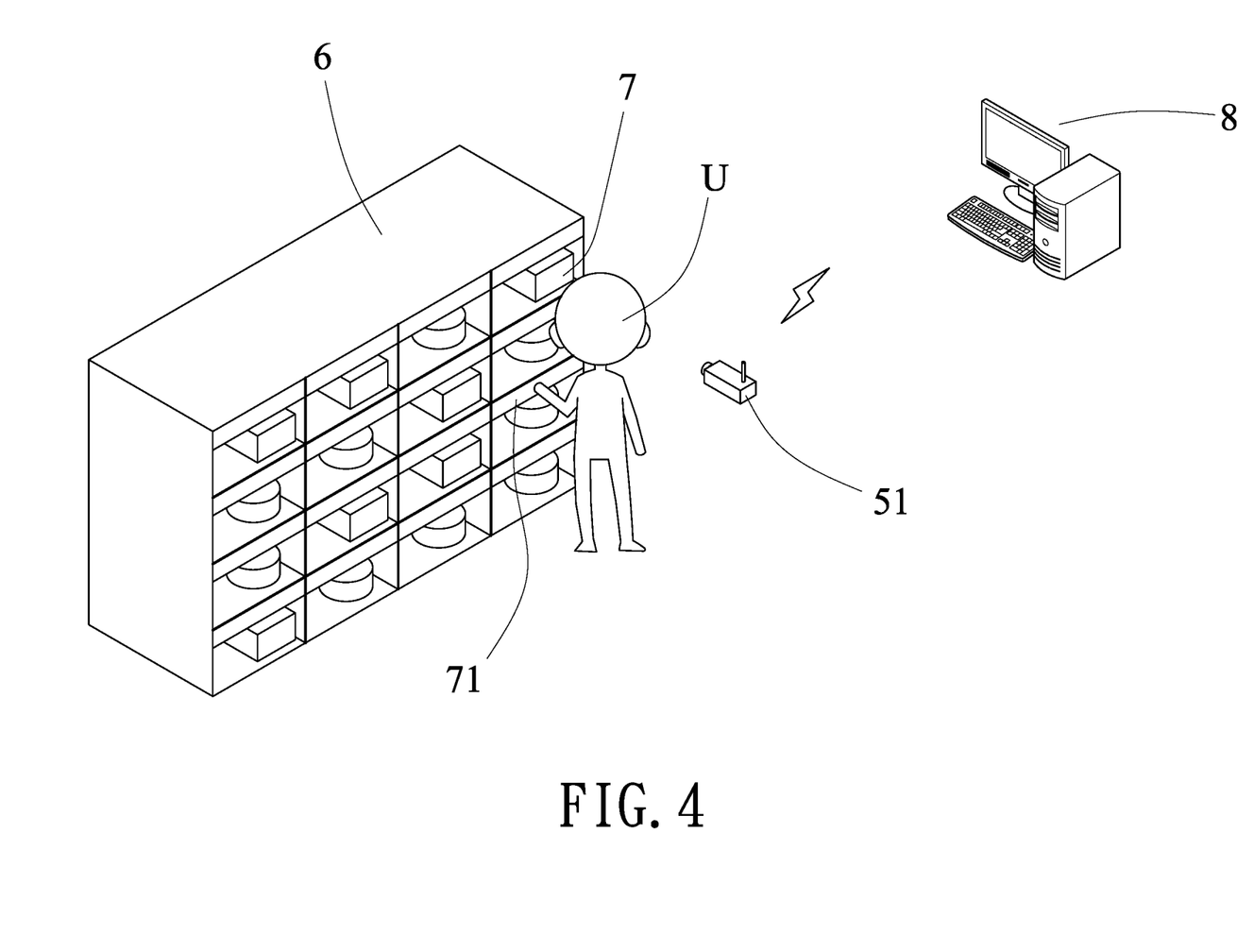
FIG. 4 is another schematic drawing showing an embodiment in use according to the present invention.

Refer to FIG. 4, when the consumer U walks to the corresponding shelf 6, each kind of goods 7 on the shelf 6 is provided with the product tag 71 which can also be a touch display device. After being touched by consumers, the product tag 71 is activated and a message of activation is sent to the content management system 3 so that the content management system 3 recognizes the product tag 71 of which goods 7 is activated and then delivers a message related to the goods 7 corresponding to the product tag 71 to the point-of-sale system 4. Next the point-of-sale system 4 get the message related to the goods 7 across to an electronic commerce system. Thereby information related to the goods 7 such as price, promotions, other available platforms, etc. is displayed on the product tag 71 for the customer's (U) reference.

As shown in FIG. 3 and FIG. 4, the operating and display device 1, the information module 2, the content management system 3, the point-of-sale system 4, the image recognition module 52 of the camera recognition module 5, and the electronic commerce system can be arranged at one or a plurality of servers 8 which can be a physical server or cloud server.

In summary, the present invention has the following advantages compared with the techniques available now.
1. After input of the needs through the operating and display device of the present system, the customer can find out the goods he/she wants and recognize the positions of the goods quickly. Thus, the time it takes to search the goods in the store is significantly reduced. The store can be operated with fewer employees so that the operating cost is reduced.
2. Even the positions of the goods are changed, the position information of the goods in the point-of-sale system can be modified automatically in a real-time manner by the camera recognition module which recognizes the positions of the goods on the shelf automatically. Thus, there is no need to input the position information of the goods by labor and input error caused by manual operation can be avoided. In addition, the content management system can also set whether to modify the permissions to each store manager, once it is detected that the product is moved to the shelf that no longer corresponds, the store manager can confirm on the content management system whether he agrees to directly change the product information, or then send the clerk to adjust the product to the correct shelf.
3. The present system can be applied to various types of stores, especially those sell a plurality of products such as pharmacies, cosmetic stores, grocery stores, hardware stores, etc. and thus having a wide range of applications.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. An intelligent shelf management system, comprising:
an operating and display device including at least an input module, an output module, and a display module, the display module being connected to the input module and the output module, wherein a user inputs a demand for goods upon entering a retail establishment via the input module, and the input module having at least one of a touch interface and a voice-operated interface and being configured to adaptively format the display module to display the demand for goods input by a corresponding user;
an information module subsystem electrically connected to the operating and display device and including a database of goods and an analysis module that is configured to receive the demand for goods input by a corresponding user, wherein the database of goods includes product information of a plurality of goods sold at the retail establishment and located on respective shelves thereat, and wherein the analysis module is an artificial intelligence processor that is built using deep learning and that is configured to analyze the demand for goods input by a corresponding user applying association rules by comparing the demand for goods with the product information of the plurality of goods in the database of goods for adaptively selecting at least one good of the plurality of goods whose product information is most closely matched with the demand for goods;
a content management subsystem electrically connected to the information module subsystem and being configured to receive the product information of the at least one good adaptively selected by the analysis module;
a point-of-sale subsystem electrically connected to the information module subsystem and the content management subsystem, the point-of-sale subsystem including sales-related information of each of the plurality of goods sold at the retail establishment, wherein the sales-related information of each of the plurality of goods includes at least real-time position information, updated pricing information, and stock inventory information, of a corresponding good;
wherein the content management subsystem is configured to compare the product information of the at least one good adaptively selected by the analysis module with the sales-related information of the plurality of goods for adaptively selecting a good from the plurality of goods whose sales-related information is most closely matched with the product information of the plurality of goods for being transmitted to the output module of the operating and display device, and wherein the output module is configured to adaptively format the display module to display the sales-related information of the good adaptively selected by the content management subsystem; and a camera recognition subsystem electrically connected at least to the information module subsystem and including a plurality of image capture devices and an image recognition module, wherein each of the plurality of image capture devices is provided with a unique identification number and is configured to capture a plurality of images in real-time of a corresponding section of the retail establishment and transmit the plurality of images to the image recognition module, wherein the image recognition module is an artificial intelligence processor that is built using deep learning and that is configured to apply recognition rules for identifying a plurality of goods and recognizing a respective shelf location of a corresponding good from an image of the plurality of images containing representations of multiple goods to thereby generate a recognition result for each of the plurality of goods, each recognition result including identifying information of a respective good and recognition information of a corresponding shelf location of the respective good and each recognition result and the unique identification number of a corresponding image capture device being transmitted to the information module subsystem, the information module subsystem integrating each recognition result and the unique identification number of a corresponding image capture device to identify a location of a respective shelf in the retail establishment to thereby generate the real-time position information of a corresponding good in the retail establishment, and the information module subsystem transmitting the real-time position information for each of the plurality of goods sold at the retail establishment to the point-of-sale subsystem for inclusion of the real-time position information of a respective good from the plurality of goods with the sales-related information of the corresponding good.

2. The system as claimed in claim 1, wherein a product tag is disposed on a corresponding shelf of the shelves at the retail establishment to be located adjacent to a respective good of the plurality of goods sold at the retail establishment.

3. The system as claimed in claim 2, wherein the product tag is a touch display device for showing information related to the goods.

4. A method of operating an intelligent shelf management system, comprising;

providing an operating and display device, an information module subsystem, a content management subsystem, a point-of-sale subsystem, and a camera recognition subsystem, wherein the operating and display device includes at least an input module, an output module, and a display module connected to the input module and the output module, wherein the information module subsystem is electrically connected to the operating and display device and includes a database of goods and an analysis module, wherein the content management subsystem is electrically connected to the information module subsystem, wherein the point-of-sale subsystem is electrically connected to the information module subsystem and the content management subsystem, and wherein the camera recognition subsystem is electrically connected at least to the information module subsystem and includes a plurality of image capture devices and an image recognition module;

inputting a demand for goods by a user upon entering a retail establishment via the input module of the operating and display device, and adaptively formatting the display module by the input module for displaying the demand for goods input by a corresponding user;

transmitting the demand for goods input by a corresponding user to the analysis module of the information module subsystem, wherein the database of goods includes product information of a plurality of goods sold at the retail establishment and located on respective shelves thereat, and wherein the analysis module is an artificial intelligence processor that is built using deep learning for application of association rules;

receiving the demand for goods input by a corresponding user by the analysis module, and analyzing the demand for goods by comparing the demand of goods with the product information of the plurality of goods in the database of goods by the analysis module for adaptively selecting at least one good of the plurality of goods whose product information is most closely matched with the demand of goods;

delivering transmitting the product information of the at least one good adaptively selected by the analysis module to the content management subsystem and the content management subsystem receiving the product information of the at least one good, wherein the point-of-sale subsystem includes sales-related information of each of the plurality of goods sold at the retail establishment, and wherein the sales-related information of each of the plurality of goods includes at least real-time position information, updated pricing information, and stock inventory information, of a corresponding good; and comparing by the content management subsystem the product information of the at least one good adaptively selected by the analysis module with the sales-related information of the plurality of goods for adaptively selecting a good from the plurality of goods whose sales-related information is most closely matched with the product information of the plurality of goods, and transmitting the sales-related information of the good adaptively selected by the content management subsystem to the output module of the operating and display device, and the output module adaptively formatting the display module for displaying the sales-related information of the good adaptively selected by the content management subsystem;

wherein each of the plurality of image capture devices of the camera recognition subsystem is provided with a unique identification number and is configured for capturing a plurality of images in real-time of a corresponding section of the retail establishment and for transmitting the plurality of images to the image recognition module of the camera recognition subsystem, wherein the image recognition module is an artificial intelligence processor that is built using deep learning and that is configured for applying recognition rules for identifying a plurality of goods and recognizing a respective shelf location of a corresponding good from an image of the plurality of images containing representations of multiple goods for thereby generating a recognition result for each of the plurality of goods, wherein each recognition result includes identifying information of a respective good and recognition information of a corresponding shelf location of the respective good and each recognition result and the unique identification number of a corresponding image capture device being transmitted to the information module subsystem, the information module subsystem integrating each recognition result and the unique identification number of a corresponding image capture device to identify a location of a respective shelf in the retail establishment for thereby generating the real-time position information of a corresponding good in the retail establishment, and the information module subsystem transmitting the real-time position information for each of the plurality of goods to the point-of-sale subsystem for inclusion of the real-time position information of a respective good from the plurality of goods with the sales-related information of the corresponding good.

* * * * *